United States Patent [19]

Jockel et al.

[11] 4,234,451

[45] Nov. 18, 1980

[54] PROCESS OF PRODUCING A REDUCING GAS

[75] Inventors: Heinz Jockel, Klein-Gerau; Friedrich W. Möller, Seulberg; Hans J. Renner, Nieder-Erlenbach; Hagen Krumm, Frankfurt am Main, all of Fed. Rep. of Germany

[73] Assignee: Metallgesellschaft Aktiengesellschaft, Frankfurt am Main, Fed. Rep. of Germany

[21] Appl. No.: 933,353

[22] Filed: Aug. 14, 1978

Related U.S. Application Data

[63] Continuation of Ser. No. 782,471, Mar. 28, 1977, abandoned, which is a continuation of Ser. No. 589,652, Jun. 23, 1975, abandoned, which is a continuation of Ser. No. 421,565, Dec. 4, 1973, abandoned.

[30] Foreign Application Priority Data

Dec. 23, 1972 [DE] Fed. Rep. of Germany ....... 2263343

[51] Int. Cl.$^2$ .............................................. C07C 1/02
[52] U.S. Cl. .................................................. 252/373
[58] Field of Search .......................................... 252/373

[56] References Cited

U.S. PATENT DOCUMENTS 3,441,395   4/1969   Dent ..................................... 252/373

FOREIGN PATENT DOCUMENTS 854150  11/1960  United Kingdom ..................... 252/373

*Primary Examiner*—Alan Siegel
*Attorney, Agent, or Firm*—Sprung, Felfe, Horn, Lynch & Kramer

[57] ABSTRACT

A reducing gas containing essentially carbon monoxide and hydrogen and only small amounts of water vapor, carbon dioxide and methane is produced by reacting a normally liquid, volatile hydrocarbon with water vapor in two stages under superatmospheric pressure in the presence of nickel-containing catalysts. The improvement of the invention involves adding from 0.02 to 0.1 standard cubic meter of hydrogen per kilogram hydrocarbon to the hydrocarbons to be gasified, subjecting the resulting mixture to a hydrogenation desulfurization and, after adding up to 1.6 kilogram water vapor per kilogram hydrocarbon, reacting said mixture in a one-part first gasification stage at temperatures of 350°–550° C. in the presence of a catalyst containing from 35–70% by weight nickel on a magnesium-containing support thereby producing a high-methane gas which is reacted further in a second stage at temperatures above 850° C. in contact with an indirectly heated heat resistant nickel catalyst.

1 Claim, 1 Drawing Figure

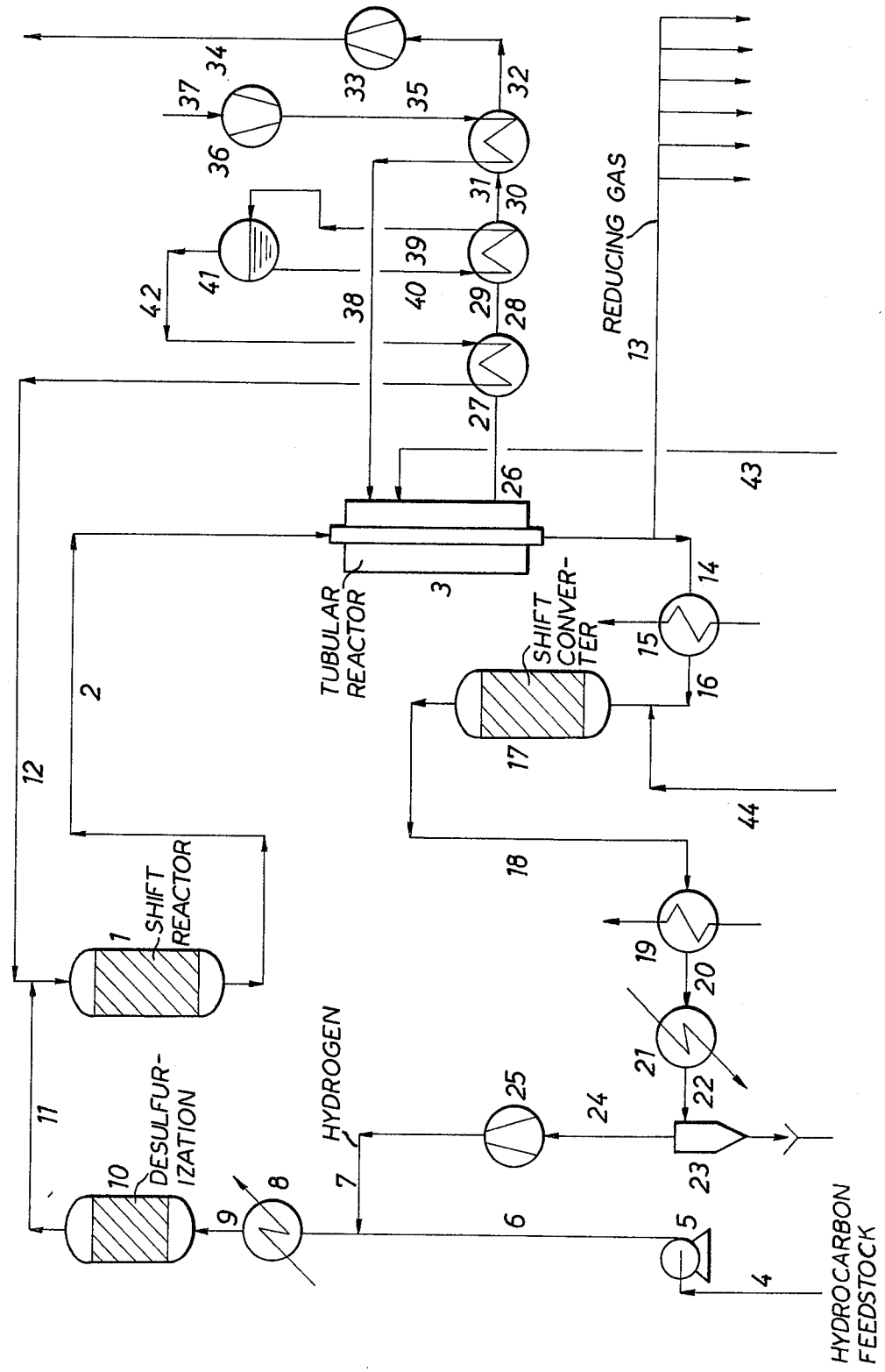

PROCESS OF PRODUCING A REDUCING GAS

BACKGROUND

This application is a continuation of Ser. No. 782,471, Mar. 28, 1977, now abandoned; which is a continuation of Ser. No. 589,652, June 23, 1975, abandoned; which is a continuation of Ser. No. 421,565, Dec. 4, 1973, now abandoned.

This invention relates to a process of producing a reducing gas which consists substantially of carbon monoxide and hydrogen and contains only small amounts of water vapor, carbon dioxide and methane, by a reaction of hydrocarbons, which under normal conditions are liquid and evaporable, with water vapor under superatmospheric pressure and in contact with nickel-containing catalysts, in two stages.

In the iron-making industry it has been attempted for years to reduce the consumption of coke in the blast furnace in order to compensate the frequent bottlenecks which occur in the supply of coke for very different reasons. The direct reducing process has recently been developed with the object of rendering the reducing of ore independent of coke as far as possible and to reduce the ore mainly or only by a treatment with reducing gases. A reducing gas for use in a blast furnace should have high contents of CO and $H_2$ and low contents of $CO_2$ and water vapor. A low methane content is also desired and the gas should be available at an elevated temperature for direct use in the blast furnace or reducing furnace.

It is known to react gaseous hydrocarbons and also liquid hydrocarbons, to the quality of heavy fuel oils, to form a gas which has high CO and $H_2$ content by a gasification with pure oxygen and, if desired, water vapor. Sulfur-containing fuels may be used in this thermal, non-catalytic reaction.

For a complete gasification of the hydrocarbon feedstocks, oxygen must be used with a surplus in order to ensure the high reaction temperatures which are required. In the product gas, this results in an increased $CO_2$ content, which is detrimental in a reducing gas.

It is also known to produce gases having high CO and $H_2$ contents, particularly synthesis gases, in that gaseous hydrocarbons or evaporable liquid hydrocarbons are cracked with water vapor at temperatures above about 750° C. and in contact with indirectly heated, preferably nickel-containing catalysts, which are indirectly heated. This process has the advantage that free oxygen is not required. In view of the catalyst, the feedstocks must be free of sulfur and the use of the process is restricted to gaseous hydrocarbons or easily evaporable hydrocarbons of the gasoline or petrol and naphta ranges.

In the known process, a reducing gas having a low $CO_2$ and $CH_4$ contents, as desired, may be produced if gaseous hydrocarbon feedstocks and high reaction temperatures above 1000° C. are used. These temperatures are limited only by the heat resistance of the externally heated catalyst tubes.

When used to produce a reducing gas from liquid hydrocarbons, these processes have the serious disadvantage that the hydrocarbons must be reacted in the presence of a surplus of water vapor in order to prevent the Boudouard reaction resulting in the formation of elementary carbon, which may deposit on the catalyst and finally may result in a clogging of the catalyst layer and the pipelines.

It is apparent that the most serious difficulty arising in the producing of a reducing gas by a reforming of hydrocarbons with water vapor concerns the reduction of the consumption of water vapor and the prevention of a formatin of carbon black. This difficulty arises in the reforming of natural gas with water vapor, although it has been overcome in commercial operations in this case, but increases as the molecules of the hydrocarbon feedstocks increase in size. The water vapor consumption is usually expressed as the water vapor ratio in kilograms water vapor per kilogram hydrocarbons.

A certain saving of water vapor without an increase of the risk of a formation of carbon black will be enabled if the feedstocks consisting of hydrocarbons and water vapor are preheated to higher temperatures individually or in a mixture with each other. On the other hand, heaters consisting of special high-alloy materials, such as are otherwise used only in the tubular heater itself, will be required if the preheating temperature of 400°–450° C., which is sufficient in a process in which syntheses gas is produced in a tubular heater, is increased to about 550°–600° C. It must be borne in mind, however, that the hydrocarbons may be cracked at the elevated temperatures above 400°–450° C.

It is also known to preheat to a higher temperature in the tubular heater itself in that a cracking catalyst of relatively low activity is used on the receiving side of the catalyst layer and the heating of the mixed feedstocks predominates over the actual reaction at said cracking catalyst.

In another known process of reforming hydrocarbons with water vapor in a tubular heater, the required water vapor is replaced in part by carbon dioxide which has been recovered from the product gas by scrubbing. In that case too, a preheating to high temperatures up to 800° C. is required.

Fianlly, it is known that the catalyists which are usual for the reforming of hydrocarbons with water vapor in a tubular heater and which contain metallic nickel on a oxide or silicatic support will be active even in the case of low water vapor ratios and without promoting a formation of carbon black if they have a low alkali content, which is usually provided in the form of alkali carbonate. In the other hand, such alkalinized catalysts are susceptible to elevated temperatures and rapidly lose activity at temperatures above about 850° C. because their alkali content is volatilized.

The known gasification at moderately elevated temperatures in two stages, which has been referred to in the literature as "hydrogasification", may be used in the gasification of liquid hydrocarbons on order to decrease in the first gasification stage, which is carried out at moderately elevated temperatures (400°–450° C.), the water vapor ratio much below 2 and thus to enable a production of a reducing gas having low $CO_2$ and $H_2O$ contents in the subsequent high-temperature stage.

It is known and in the reforming of hydrocarbons with water vapor it is generally usual to protect the sulfur-sensitive catalysts in that particularly liquid hydrocarbons are subjected in a vaporous state to a hydrogenating desulfurization before they enter the reformer. In that case, a small amount of hydrogen is added to the evaporated hydrocarbons, which are then contacted with a hydrogenating catalyst, which in most cases contain nickel and molybdenum, or cobalt and molybdenum, and are then passed through a granular bed, which consists of zinc oxide or iron oxide (red mud) and can absorb hydrogen sulfide. Thereafter, the hydrocarbon vapor is free of sulfur and contains little hydrogen and is then mixed with water vapor, heated and fed to the reactor, Although it may not be expressly stated in the description of such process, it must be assumed that the mixed feedstocks used in these processes always have a certain, though small, hydrogen content.

SUMMARY

The invention is based on the consideration that in the production of a reducing gas by a reforming with water vapor of hydrocarbons of the gasoline or petrol and naphtha ranges in the two-stage process described (gasification of gasoline or petrol at moderately elevated temperatures and further conversion of the resulting gas at more elevated temperatures), the water vapor ratio must already be decreased in the first stage if the product gas from the tubular heater should have only a small residual content of unreacted water vapor. The desired low residual contents of carbon dioxide and methane are ensured by the selection of a relativela high reaction temperature in the tubular heater. In contrast to known processes, the liquid hydrocarbons are reacted in the process according to the invention with a sufficiently small amount of water vapor in a single gasification stage at 350°–550° C. to form a gas which in a succeeding tubular heater is reacted further to form a suitable reducing gas. The essential advantages afforded by the use of a single gasification stage are a decrease of capital requirements, a simplified control of the plant, and a higher reliability of operation.

DESCRIPTION OF THE DRAWING

The drawing shows by way of example a flow scheme of a plant for carrying out the process according to the invention.

DESCRIPTION

The rate of hydrogen which is added to the hydrocarbons before their hydrogenating desulfurization is comparatively low and amounts to 0.02–0.1 standard cubic meter per kilogram of hydrocarbon. This hydrogen can be made available without a high additional expenditure, Because the reducing gas product consists in any case mainly of CO and $H_2$, it will be sufficient to branch off a small partial stream of said gas, to subject said partial stream to a shift conversion of CO to $CO_2$ and, if desired, to scrub off the $CO_2$.

High-nickel catalysts containing 35–70% by weight of nickel on a magnesium-containing support are used according to the invention to crack the liquid hydrocarbons by a treatment with water vapor in the first stage in order to produce a high-methane gas. For this reason, hydrocarbons of the gasoline or petrol and naphtha ranges can be cracked a moderately elevated temperatures of 350°–550° C. and with water vapor ratios of and below 1.6 so as to form a high-methane gas which has a relatively low water vapor content. Such catalysts have suitably a carrier material consisting of magnesium silicate or magnesium spinel.

Suitably, commercially available catalysts for use in reforming with water vapor are used to crack this high-methane gas in the succeeding tubular heater forming the second stage. Such catalysts may contain, e.g., 10–30% by weight nickel on a support of alumina. Because reaction temperatures above 850° C. are used in a tubular heater, alkali-free catalysts are preferred here.

The plant consists essentially of a shaft reactor 1 and a tubular heater or tubular reactor 3. As is usual in catalytic processes of crackung hydrocarbons, the hydrocarbons to be treated are passed through a desulfurizing stage 10 for the sake of precaution.

The gasoline or petrol feedstock is supplied in a conduit 4 to a pump 5, by which the feedstock is discharged under the required pressure to flow to an evaporator 8 in a conduit 6 together with hydrogen-containing gas from conduit 7.

At a temperature of 300°–400° C., the mixture consisting of a evaporated gasoline or petrol and $H_2$-containing gas flows in conduit 9 to the desulfurizing stage 10, which normally contains a hydrogenating catalyst, which is succeeded by beds of hydrogen sulfide-containing material, such as iron oxide or zinc oxide.

The sulfur-free mixture flows now in conduit 11 to the richgas reactor 1. Reactant water vapor at a temperatur of 450° C. is previously admixed from conduit 12 to said mixture. the shaft reactor 1 contains a high-activity nickel catalyst. The hydrocarbons are cracked to form a high-methane gas which still contains carbon dioxide and hydrogen whereas carbon monoxide will not be formed in significant quantities if the reaction temperature is kept between 400° and 500° C.

The gas leaving the shaft reactor 1 through a conduit 2 may be further superheated and is supplied into the tubular reactor 3, in which the gas is completely reacted in contact with the catalyst which is contained in the reactor 3 and by indirect heating is held at a temperature above 850° C. The hot product gas is poor in water vapor and carbon dioxide and can be directly supplied into the reducing process in a lined pipe system 13.

The tubular reactor 3 is indirectly heated by y number of burners, which are supplied with fuel from conduit 43 and with preheated combustion air from conduit 38.

The fuel gases produced by this combustion deliver only part of their heat in the tubular reactor 3 and are withdrawn drawn at a temperature of and above 1000° C. from the tubular reactor in the conduit 26. The sensible heat of these hot flue gases is utilized in a heat exchanger 27 to superheat the reactant water vapor. This reactant water vapor is supplied from a steam drum 41 in a conduit 42 to the heat exchanger 27 and is then supplied in conduit 12 to the process. Behing the heat exchanger 27, the flue gases are cooled further as they flow in a conduit 28 to a waste heat steam boiler 29. The water side of that waste heat boiler is connected by conduits 39 and 40 to the steam drum 41.

The flue gases are cooled further in a combustion air preheater 31, to which the flue gases are supplied in a conduit 30. Combustion air is supplied in a conduit 37 to a blower 36 and flows in a conduit 35 to a combustion air preheater 31 and from the latter in a conduit 38 to the tubular reactor 3. Behind the combustion air preheater 31, the cooled flue gases flow in a conduit 32 to a flue gas blower, which delivers them into a chimney 34.

A small partial stream of the product gas is branched off from conduit 13 and in conduit 14 is supplied to a waste heat steam boiler 15, in which the gas is cooled to about 400° C. The gas is then supplied in conduit 16 to a high-temperature reactor 17 for a shift conversion of CO to $CO_2$. The water side of the waste heat steam boiler 15 communicates with the steam drum 41. In the shift conversion 17, water vapor from conduit 44 is injected into the reactant gas and the latter is converted in contact with an iron oxide-containing catalyst to a low-CO gas. This gas is supplied in conduit 18 to the waste heat boiler 19 and lows from the latter in conduit 20 to the heat exchanger 21, in which the gas is cooled to the ambient temperature. The cooled gas flows in conduit 22 to the separator 23, where the water vapor is separated, which has been condensed as the gas was cooled. In conduit 24, the gas flows to a centrifugal compressor 25, which supplies the gas in conduit 7 to the gasoline or petrol to be desulfurized.

EXAMPLES

The gasoline or petrol is a so-called "full-range" naphta having a boiling range from 36°–187° C. and a sulfur content of 110 milligrams and contains 110 milligrams sulfur per kilogram naphtha. This feesstock is first supplied to a desulfurizing stage, which is operated under a pressure of 14 kilograms per square centimeter (Absolute pressure) and at a temperature of 385° C. The desulfurizing stage comprises a hydrogenating layer of a catalyst which contains cobalt and molybdenum, followed by a sulfur-absorbing layer of zinc oxide. Before the gasoline or petrol is desulfurized, hydrogen gas for the hydrogentating desulfurization is added at a rate of 0.05 standard cubic meter per kilogram of gasoline or petrol.

The following experiments were conducted with the desulfurized gasoline or petrol:

FIRST EXPERIMENT

The gasoline or petrol was reacted in a conventional manner in a tubular reactor (tubular heater) on a catalyst which was indirectly heated to high temperatures.

SECOND EXPERIMENT

In a two-stage operation, the tubular reactor used also in the First Experiment was preceded by a shaft reactor, which was operated at lower temperatures and contained a catalyst on which the water vapor converted the gasoline or petrol to a high-methane gas which contained hydrogen. A high-activity catalyst was used, which had a large surface area and contained 35% by weight nickel on a magnesium silicate support.

THIRD EXPERIMENT

In a two stage-operation, the tubular reactor used also in the First Experiment was preceded by a shaft reactor, which was operated at lower temperatures and contained a catalyst on which the water vapor converted the gasoline or petrol to a high-methane gas, which contained hydrogen. A high-activita catalyst was used, which had a large surface area and contained 45% by weight of nickel on a magnesium spinel support.

FOURTH EXPERIMENT

In a two-stage operation the Third Experiment was repeated with the difference that the first-mentioned rate at which hydrogen gas was added to the gasoline or petrol before the first desulfurization was increased to 0.1 standard cubic meter per kilogram of gasoline or petrol. Specifically, the several experiments were carried out as follows:

In the First Experiment the gasoline or petrol described hereinbefore, at a rate of 2 kilograms per hour, and $H_2$ gas, at a rate of 0.1 standard cubic meter per hour, were preheated to 385° C. and under a pressure of 14 kilograms per square centimeter were passed through the above-described desulfurizing stage. The desulfurized gasoline or petrol was now mixed with water vapor at a rate of 5 kilograms per hour, and the mixture was reacted in a pressure-resisting reaction vessel (tubular heater), which was externally heated and contained 4 liters of catalyst. The catalyst contained 20% by weight of nickel on an alumina support. The mixed feedstocks consisting of gasoline or petrol and water vapor were preheated and were at a temperature of 500° C. as they entered the reaction space. The reaction vessel was externally heated to maintain the exit temperature of the product gas at 1000° C. The pressure at the outlet of the reaction vessel was 3 kilograms per square centimeter (absolute pressure). At a rate of 10.3 standard cubic meters per hour, a product gas was obtained which had the following composition on a dry bases:

| | |
|---|---|
| $CO_2$ | 5.3 % by vol. |
| CO | 25.6 % by vol. |
| $H_2$ | 69.0 % by vol. |
| $CH_4$ | 0.1 % by vol. |

The gas contained 24.4% water vapor. After an operation for 10 hours, carbon in the form of carbon black was found in the product. An increasing pressure loss required the plant to be shut down. The catalyst which was removed had partly been disintegrated and was intermingled with carbon black.

In the Second Experiment, the tubular heater was preceded by a reactor which contained a high-activity nickel catalyst having a large area and containing 35% by weight nickel on a magnesium silicate support. 1 liter of this catalyst was contained in this reactor.

In this two-stage system, 2 kilograms gasoline or petrol, 0.1 standard cubic meter $H_2$ gas, and 5 kilograms water vapor were also reacted per hour. The mixture was preheated to 410° C. The preceding reactor was operated under a pressure of 10 kilograms per square centimeter (absolute Pressure) and with an exit temperature of 430° C. The gas produced in this reactor at a rate of 3.8 standard cubic meters per hour had the following composition on a dry basis:

| | |
|---|---|
| $CO_2$ | 23.4 % by volume |
| CO | 0.3 % by volume |
| $H_2$ | 14.9 % by volume |
| $CH_4$ | 61.3 % by volume |

The gas still contained 1.20 standard cubic meters water vapor per standard cubic meter of dry gas. The resulting reaction mixture was introduced at a temperature of 430° C. into the tubular heater. The heating system was operated so that the product gas had a temperature of 1000° C. This product gas had approximately the same composition as the product gas of the first experiment.

In the Second Experiment, the tubular heater could be operated for prolonged time without trouble and with an unchanged pressure loss.

After 300 hours of satisfactory operation, the rate of water vapor was reduced from 5 kilograms to 2.8 kilograms per hour. The gas leaving the preceding reactor at a rate of 3.5 standard cubic meters per hour, had the following composition on a dry basis:

| | |
|---|---|
| $CO_2$ | 23.2 % by vol. |
| CO | 0.4 % by vol. |
| $H_2$ | 8.6 % by vol. |

| | |
|---|---|
| -continued | |
| CH$_4$ | 67.7 % by vol. |

The gas still contained 0.54 standard cubic meter water vapor per standard cubic meter of dry gas. The gas leaving the tubular heater had the following composition on a dry basis:

| | |
|---|---|
| CO$_2$ | 0.8 % by vol. |
| CO | 31.6 % by vol. |
| H$_2$ | 67.3 % by vol. |
| CH$_4$ | 0.3 % by vol. |

This gas was obtained at a rate of 9.8 standard cubic meters per hour, under a pressure of 3 kilograms per square centimeter (absolute pressure) and at a temperature of 1000° C. Per standard cubic meter of dry gas, the gas contained 0.030 standard cubic meter water vapor.

The tubular heater was operated for a prolonged time without trouble and with an unchanged pressure loss.

After further 350 hours, gasoline or petrol left the first stage together with the gas. 44 operating hours thereafter, a pressure rise in the tubular heater resulted. The plant was shut down and the catalyst layers were removed. The high-activity nickel catalyst of the first reactor did not exhibit external changes. Carbon black had deposited on the catalyst of the tubular heater.

In the Third Experiment, the tubular heater of the First Experiment was preceded by a reactor which contained a high-activity nickel catalyst having a large surface area and containing 45% by weight nickel on a magnesium spinel support. This reactor contained 1 liter of catalyst.

This two-stage system was used for an experiment corresponding to the second part of the Second Experiment. 2 kilograms gasoline or petrol, 0.1 standard cubic meter H$_2$ gas, and 2.8 kilogram water vapor were fed per hour to this two-stage system. The mixture was preheated to 410° C.

The preceding reactor was operated under a pressure of 10 kilograms per square centimeter (absolute pressure) and at 430° C. The tubular heater, was operated to discharge a product gas at 1000° C. and under a pressure of 3 kilograms per square centimeter (absolute pressure). The gases formed in these reactors did not substantially differ in rate and composition from those obtained under the same experimental conditions in the Second Experiment.

After a satisfactory operation for 600 hours, the charge was increased to 1.5 times the previous rate so that 3 kilograms gasoline or petrol, 0.15 standard cubic meter H$_2$ gas, and 4.2 kilograms water vapor were fed to the experimental system per hour. It was still possible to operate the experimental system without trouble and with a pressure loss which was only slightly larger, owing to the increased charge. After a satisfactory operation for 200 additional hours, gasoline or petrol left the first stage together with the gas. 30 hours later, a pressure rise in the tubular heater resulted. The plant was shut down and the reaction vessels were emptied. The high-activity nickel catalyst of the first stage did not exhibit visible changes. Carbon black had deposited on the catalyst of the tubular heater.

As will be shown hereinafter in connection with the Fourth Experiment, the life of the catalyst used in the first stage will be increased if more hydrogen is admixed to the mixed feedstocks. Specifically, a higher hydrogen rate prolongs the time until gasoline or petrol leaves the first stage together with the gas formed therein. As a result, the reaction in the tubular heater can be performed in the tubular heater for a prolonged time with a sufficiently large margin of safety relative to the carbon black limit even in the presence of a small amount of water vapor.

A Fourth Experiment was carried out substantially under the same conditions as the Third Experiment, with the difference that twice as much H$_2$ gas added to the gasoline or petrol before the desulfurizing stage. The following experiment was conducted:

The tubular heater used also in the First Experiment was preceded by a reactor which was filled with the same high-activity nickel catalyst as in the Third Experiment. This reactor contained 1 liter of catalyst.

2 kilograms gasoline or petrol were reacted with 0.2 standard cubic meter H$_2$ gas and 2.8 kilograms water vapor per hour in this two-stage system. The preceding reactor was operated under a pressure of 10 kilograms per square centimeter (absolute pressure) and with an exit temperature of 430° C. In this preceding reactor, a gas was produced at a rate of 3.5 standard cubic meters per hour; this gas had the following composition on a dry basis:

| | |
|---|---|
| CO$_2$ | 0.9 % by vol. |
| CO | 31.5 % by vol. |
| H$_2$ | 67.3 % by vol. |
| CH$_4$ | 0.3 % by vol. |

The gas still contained 0.54 standard cubic meter water vapor per standard cubic meter of dry gas. The gas leaving the tubular heater had the following composition on a dry basis:

| | |
|---|---|
| CO$_2$ | 0.9 % by vol. |
| CO | 31.5 % by vol. |
| H$_2$ | 67.3 % by vol. |
| CH$_4$ | 0.3 % by vol. |

The gas rate was 9.9 standard cubic meters per hour. The gas was under a pressure of 3 kilograms per square centimeter (absolute pressure) and at a temperature of 1000° C. and contained 0.031 standard cubic meter water vapor per standard cubic meter of dry gas.

After 600 hours of satisfactory operation, the charge was increased to 1.5 times the previous rate. Specifically, 3 kilograms gasoline or petrol, 0.3 standard cubic meter H$_2$ gas and 4.2 kilogram water vapor were fed to the experimental system. After additional 350 hours of satisfactory operation, the experiment was discontinued. The system was shut down and the reaction vessels were emptied. The catalyst from both reaction vessels did not exhibit visible changes.

What is claimed is:

1. A process for producing a reducing gas for the reduction of ore, said reducing gas containing essentially carbon monoxide and hydrogen and only small amounts of water vapor, carbon dioxide and methane, which comprises mixing vaporized normally liquid hydrocarbons with 0.05 to 0.1 standard cubic meter of hydrogen per kilogram hydrocarbons and subjecting the resulting mixture to a hydrogenating desulfurization, adding water vapor to the gaseous product of the desulfurization and reacting the mixture containing 1.4 kg. water vapor per kilogram hydrocarbons in a one-part shaft reaction zone at temperatures in the range of 350°–550° C. and at a pressure of 2–16 kilograms per square centimeter in the presence of a catalyst containing 35–70% by weight nickel on a support selected from the group consisting of magnesium silicate and magnesium spinel hereby producing a high-methane gas, reacting said high-methane gas in a tubular reaction zone at temperatures in the range of 950°–1100° C. and at a pressure of 2–16 kilograms per square centimeter in contact with an indirectly heated catalyst containing 10–30% by weight nickel on a support thereby producing said reducing gas.

* * * * *

UNITED STATES PATENT AND TRADEMARK OFFICE
CERTIFICATE OF CORRECTION

PATENT NO. : 4,234,451

DATED : November 18, 1980

INVENTOR(S) : Heinz Jockel, et al.

It is certified that error appears in the above—identified patent and that said Letters Patent is hereby corrected as shown below:

Column 1, line 54, "naphta" should be --naptha--.
Column 2, line 5, "formatin" should be --formation--.
Column 2, line 21, "sytheses" should be --synthesis--.
Column 2, line 37, "catalyists" should be --catalysts--.
Column 2, line 39 "a" second occurrence should be -- an --.
Column 2, line 44 "In" should be --On--.
Column 3, line 20, "relativela" should be --relatively--.
Column 4, line 1, "crackung" should be --cracking--.
Column 4, line 10 "a" should be --an--.
Column 4, line 16, "temperatur" should be --temperature--.
Column 4, line 18, "the" should be --The--.
Column 4, line 32 "y" should be --a--.
Column 4, line 38 delete "drawn".

UNITED STATES PATENT AND TRADEMARK OFFICE
CERTIFICATE OF CORRECTION

PATENT NO. : 4,234,451            Page 2 of 2
DATED : November 18, 1980
INVENTOR(S) : Heinz Jockel, et al.

It is certified that error appears in the above—identified patent and that said Letters Patent is hereby corrected as shown below:

Column 4, line 44 "Behing" should be ''Behind--.
Column 4, line 65 insert "reactor" before --17--.

Column 5, line 12 "naphta" should be --naptha--.
Column 5, line 14 "naphtha" should be --naptha--.
Column 5, line 14, "feesstock" should be --feedstock--.
Column 5, line 49 "activita" should be --activity--.
Column 8, line 10 insert "was" before "added".

Signed and Sealed this

Tenth Day of March 1981

[SEAL]

Attest:

RENE D. TEGTMEYER

Attesting Officer      Acting Commissioner of Patents and Trademarks